United States Patent [19]

Harvey

[11] 4,095,326
[45] Jun. 20, 1978

[54] METHOD AND APPARATUS FOR INSERTING POST-STRESSING TENDONS IN CONCRETE STRUCTURES

[75] Inventor: John Terence Crawford Harvey, Beaconsfield, England

[73] Assignee: Societe Technique Pour L'Utilisation De La Precontrainte, Boulogne, France

[21] Appl. No.: 683,063

[22] Filed: May 4, 1976

[30] Foreign Application Priority Data

May 6, 1975 United Kingdom ............... 19027/75

[51] Int. Cl.² ............................................ B23P 17/00
[52] U.S. Cl. ....................................... 29/417; 29/241; 29/433; 29/452; 254/1; 254/134.3 R
[58] Field of Search ................. 29/433, 452, 241, 417; 254/1, 134.3 R, 134.5; 52/230

[56] References Cited

U.S. PATENT DOCUMENTS

| | | | |
|---|---|---|---|
| 3,106,771 | 10/1963 | Spiro | 29/433 UX |
| 3,225,500 | 12/1965 | Martter | 52/230 X |
| 3,672,015 | 6/1972 | Fisher | 29/417 X |
| 3,827,132 | 8/1974 | Bratchell | 29/452 X |
| 3,942,238 | 3/1976 | Dore | 29/433 |
| 3,975,815 | 8/1976 | Mori | 29/433 |

*Primary Examiner*—Charlie T. Moon
*Attorney, Agent, or Firm*—McCormick, Paulding & Huber

[57] ABSTRACT

In the post-stressing of concrete structures, a tendon comprised of a plurality of elongated strands is formed by inserting elongated strands which will eventually form the tendon into a plurality of parking ducts and then withdrawing the plurality of strands simultaneously as a group from the parking ducts and into the duct of the structure to be post-stressed without fouling and jamming. Once in the ducts of the structure, the strands are anchored and post-tensioned as a tendon to develop the desired stress.

11 Claims, 10 Drawing Figures

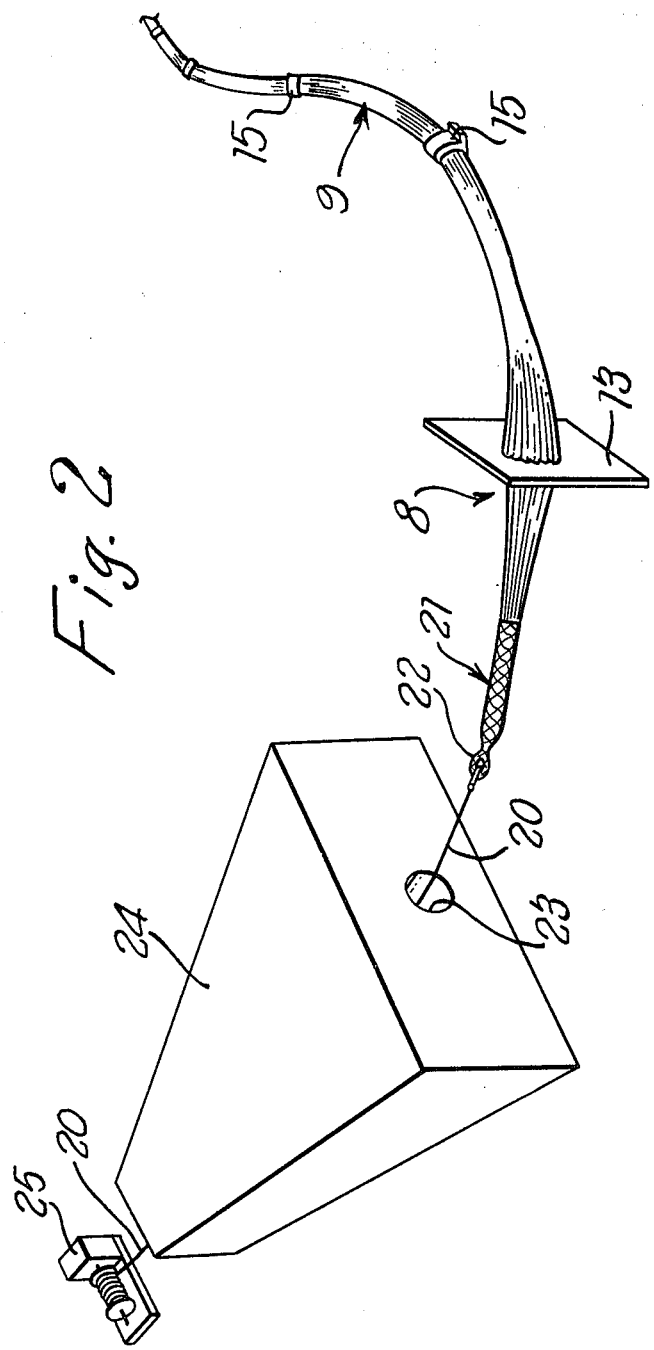

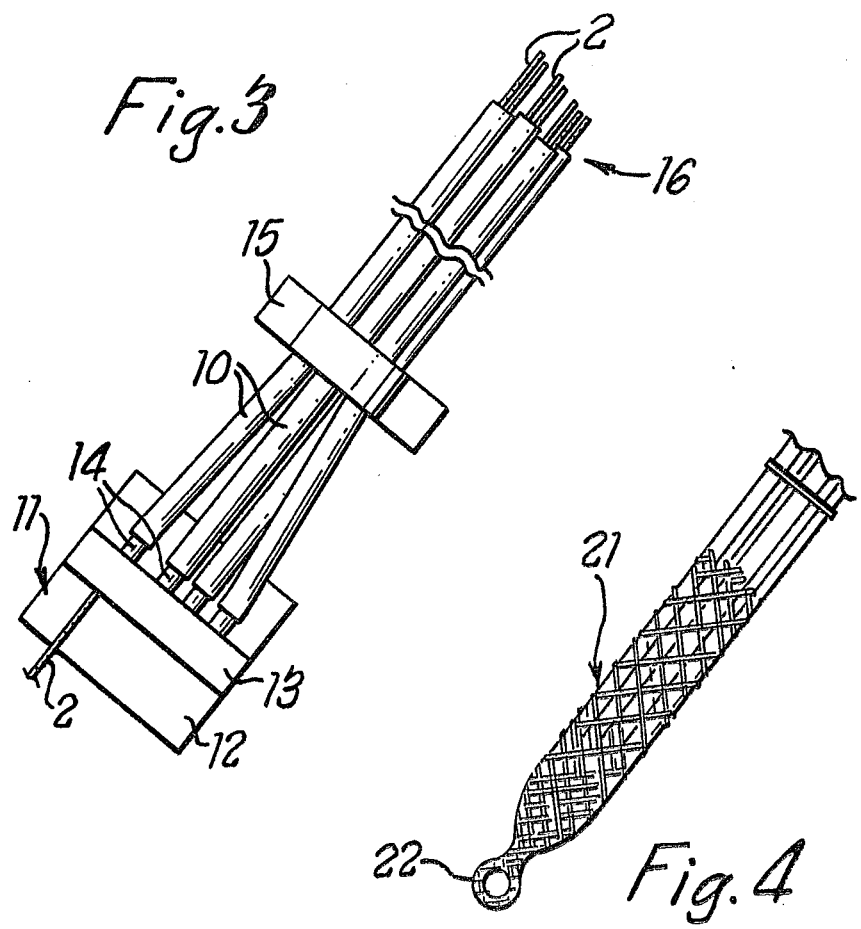

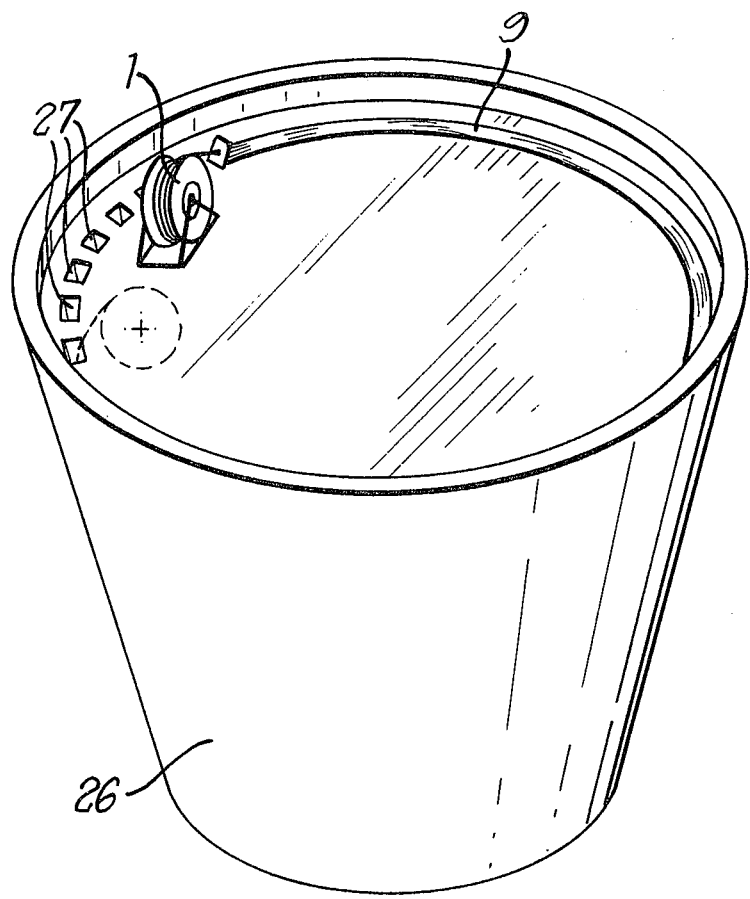

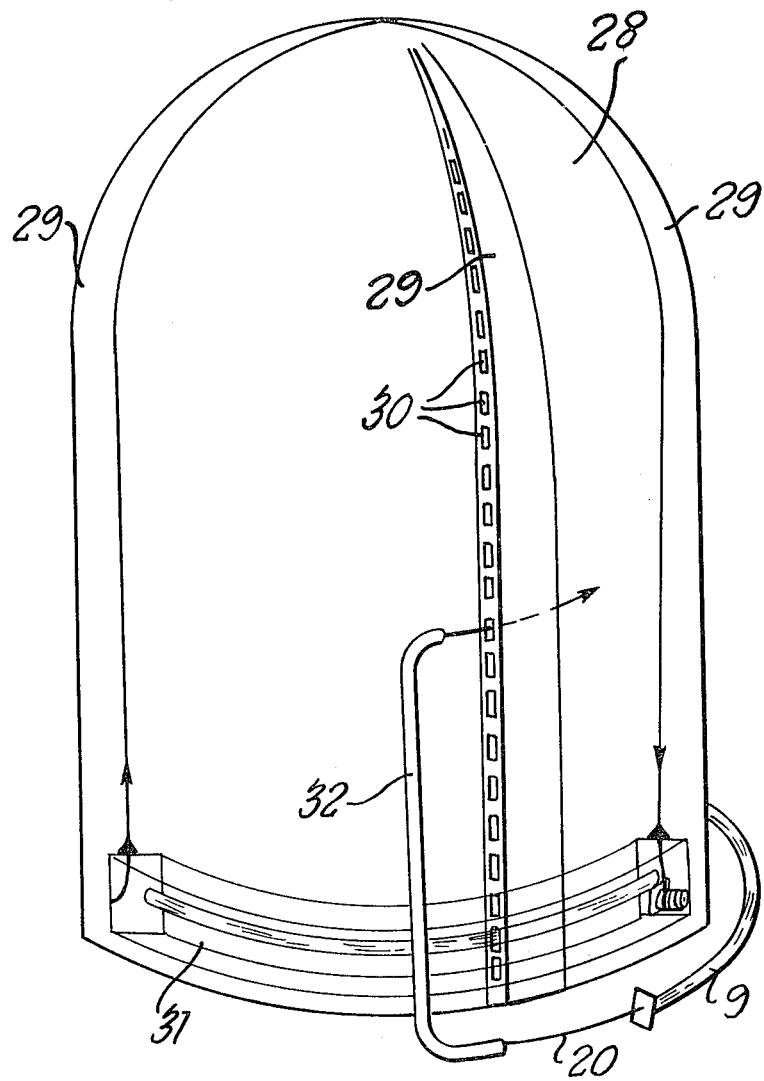

METHOD AND APPARATUS FOR INSERTING POST-STRESSING TENDONS IN CONCRETE STRUCTURES

BACKGROUND OF THE INVENTION

This invention relates to an improved method and apparatus for inserting post-stressing tendons in concrete structures.

In the fabrication of concrete structures, for example bridges, nuclear pressure and containment structures, the structure is formed with ducts therein for the reception of metal tendons which are post-stressed after the concrete has hardened. Such tendons take the form of a plurality of wires, bars or strands, hereinafter conveniently referred to as "strands." Depending upon the size of the structure and the loads which it will have to bear will depend the number of ducts formed in the structure and the size of these ducts. The number of strands which lie in each duct may vary from 2 to 90 or more and the cross-sectional size of the ducts will depend upon the number of strands that it is to receive. The normal method of positioning the strands into the duct is to feed them in one by one but in structures in which the lengths of the ducts or their vertical height are considerable or in which the curvatures of the duct profiles are severe or these effects occur in combination, feeding by this method is impossible and an alternative method must be used. Normally, the whole tendon is pre-assembled elsewhere, bound into a coil, transported to the structure and loaded into an uncoiler from hich it is pulled by a winch into the duct. The use of this alternative method requires adjacent covered factory accommodation, and a number of expensive items of mechanical plant and therefore much increased cable threading costs.

It is the main object of the present invention to provide a method and apparatus for using the normal method of one-by-one threading for all cables regardless of the severity of the threading difficulty.

SUMMARY OF THE INVENTION

According to the present invention, there is provided in the post-tensioning of concrete structures, a method of inserting a post-stressing tendon into a duct in the structure which includes inserting at least one strand into an elongate parking duct, inserting at least one further strand into at least one further elongate parking duct, and drawing all of said strands simultaneously from said parking ducts into the duct in the structure.

The method may also include feeding the strands successively from a coil thereof through a feeder device to said parking ducts, each length of strand being severed from the coil after it is in position in the parking duct.

The method may also include gripping one end of each strand in a gripping device and drawing the gripping device through the duct in the structure to position the tendon therein.

The invention also includes apparatus for carrying out the above method which includes a sheaf of open ended elongate tubes, each to receive at least one strand, means for feeding successive lengths of strand from a supply coil to each of said tubes, means for severing successive lengths of strand from the supply coil, and means for drawing all of said strands simultaneously from said tubes and into a common duct in a concrete structure to form a tendon therein.

The said means for drawing the strands simultaneously into the common duct may include a gripping device in the form of a sock having a mesh structure with a ring at its closed end so that on the sock surrounding an end portion of all the strands and the ring being used to draw the tendon through the duct in the structure, the sock will grip the strands with a force dependent on the force used to draw the tendon through the duct.

BRIEF DESCRIPTION OF THE DRAWINGS

The invention will now be described more particularly, by way of example only, and with reference to the accompanying diagrammatic drawings which illustrate how the invention is to be applied, and in which:

FIG. 2 is a perspective view illustrating how the tendon is drawn into the concrete structure;

FIG. 3 is a plan view of part of the apparatus of FIG. 1;

FIG. 4 is a plan view of part of the apparatus of FIG. 2;

FIG. 9 is a perspective view of a typical large concrete structure to have tendons located therein; and FIG. 10 is a perspective view of a further typical concrete structure to have tendons located therein.

DESCRIPTION OF THE PREFERRED EMBODIMENTS

Figure 1:
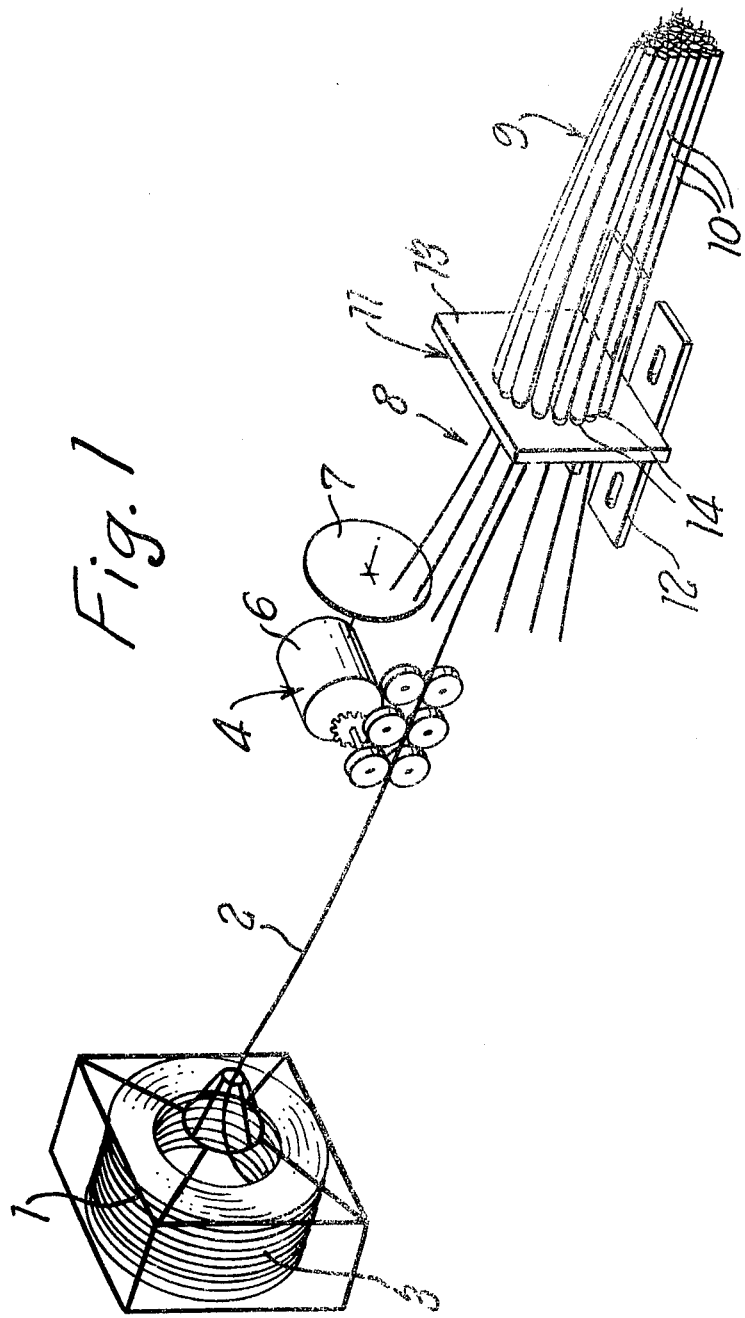
FIG. 1 is a perspective view of apparatus according to the invention illustrating how the strands are fed into parking ducts.

Strands which are used in forming tendons in post-stressed concrete structures are conveniently supplied by the manufacturers thereof in a framework which houses a coil of a single long strand. The strand may be dispensed from the framework, and a typical dispenser is illustrated at 1 in FIG. 1. The strand 2 may be dispensed from the coil 3 of the dispenser 1 by a dispensing mechanism illustrated at 4 which typically comprises pairs of rollers 5, all of which are driven through suitable gearing from a power source 6. A device may be incorporated for measuring the length of the strand. A cutting mechanism 7 is also provided for severing lengths of strand near to the forward end 8 of which may be termed a "quiver" 9 of tubes 10 conveniently formed of polyethylene. The number of tubes 10 will depend upon the number of strands which are to make up each tendon.

The forward end 8 of the quiver 9 is shown in more detail in FIG. 3, and includes a guide 11 having a base 12 and a vertically disposed apertured block 13, the number of apertures in the block 13 being equal to the number of tubes 10 in the quiver 9. Each aperture has a projecting sleeve 14 over each of which one end of a tube 10 is positioned so as to form a lead-in as strands are fed to the tubes.

The quiver 9 being formed of polyethylene tubes 10 is reasonably flexible and may be positioned to assume a gradual curve as illustrated in FIG. 2 to suit site requirements. The tubes 10 may be provided with intermediate clamps 15 along its length so as to retain the tubes 10 in their correct relative positions. Both ends of the tubes 10 are open so that the strands may pass completely through the tubes and, if necessary, and as illustrated in FIG. 3, project from the rear end 16 of the quiver.

Figure 5:
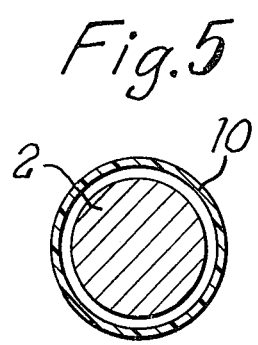
FIGS. 5 to 8 are cross-sectional views through typical parking ducts.
Figure 6:
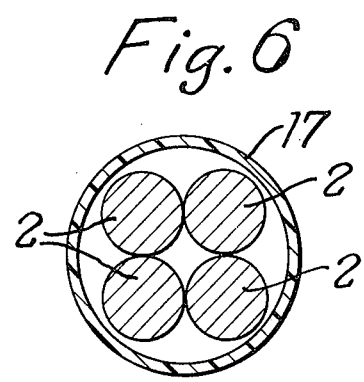
Figure 7:
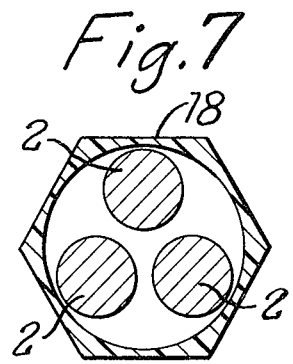
Figure 8:
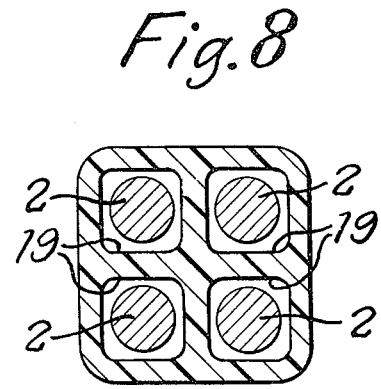

The tubes 10 which make up the quiver 9 of FIG. 1 are, in this embodiment, of circular cross-section as illustrated in FIG. 5, each having an internal diameter slightly greater than the diameter of the strand 2, but it will be appreciated that tubes or other elongate ducts for the reception of the strands having other cross-sectional shapes may be employed. Typical examples are illustrated in FIGS. 6, 7 and 8, and in FIG. 6 it will be seen that a circular tube 17 of a diameter great enough to house four strands 2 may be employed. As illustrated in FIG. 7, each tube or duct may have a circular internal section but have six external flat faces 18 for nesting purposes. A duct of this nature may house three strands 2. Still further, as illustrated in FIG. 8, each duct may be extruded to form separate integral ducts 19, each housing a strand 2. Although four such ducts are illustrated it will be appreciated that more or less than four may be formed.

Although the ducts described above have been prefabricated specifically for the purpose of receiving the strands 2, the invention envisages that the parking ducts for the strands may be formed of ducts within the concrete structure itself. These parking ducts may indeed be the tendon receiving ducts which as yet have not received their tendons or separate ducts may be formed in the concrete structure for the purpose of parking the strands prior to them being formed into a tendon.

Alternatively, the parking ducts my be formed by holes drilled in the ground.

The initial stages of forming the tendons to be drawn into the concrete structure are, therefore, to bring to site a supply of strand in the form of coils 3, together with the ancilliary apparatus which includes the feeding device 4 and cutting device 7, together with the one or more quivers 9 and blocks 11. The quiver 9, being long in length, but also being relatively flexible, can be accommodated on site in most cases.

Strand 2 is then dispensed from the dispenser 1 by the feeding machine 4 and the strand is fed successively into the tubes 10 of the quiver 9. As soon as the required length of strand is positioned within a tube, or in some instances, has passed completely through the tube and some of the strand lies outside the rear end of the tube, that part of the strand is severed by the cutting device 7 which will enable the free end of the strand from dispenser 1 to be fed into another tube. When all the tubes 10 of the quiver 9 are filled, or when an appropriate number have been filled, then the initial stage in forming the tendon has been completed.

The next stage is to bring the free end portions of the strands together in the area indicated at 8 in FIG. 1, so as to enable means to be applied to the end of the strands to draw the bunch of strands into the concrete structure.

One means for connecting the end of the strands which lie in the quiver 9 to a cable 20 (see FIG. 2) is a sock 21 illustrated in FIG. 4. This sock 21 may conveniently be formed of a mesh structure of metal so that its internal diameter will increase as its length decreases, and when surrounding a substantially tubular member, the sock will grip the member on its length being increased. The sock 21 is provided with a ring 22 at its closed end to which the cable 20 is attached. Alternatively, the end of the tendon may be welded together and provided with the ring 22.

As soon as a connection has been made to the end of the bunched strands, as illustrated in FIG. 2, and the cable 20 has been passed through a duct 23 in the concrete structure 24 to be post-tensioned, a winch 25 is operated to draw the cable 20 and hence the tendon of strands 2 through the duct 23.

It will be appreciated that because the whole tendon is threaded in one operation having been pre-formed in the quiver 9 there is no chance of any fouling and therefore jamming of any individual strand 2 as they pass through the duct 23. When the strands 2 which form the tendon have been drawn completely through the duct 23 they will have been drawn completely out of the quiver 9 and the quiver 9 may be used for the formation of a further tendon. Of course, on site, possibly two quivers 9 may be used with each strand dispenser 1 so that as one tendon is being drawn through the duct 23 within the concrete structure the other tendon is being formed by dispensing strands from the dispenser into the other quiver.

FIG. 9 shows a typical concrete structure 26 having tendon ducts 27 formed therein. A quiver 9 is laid on the dome of the structure in a curve and a strand dispenser 1, together with the ancilliary apparatus, is positioned to feed strands into the quiver 9. At the other end of the ducts 27 will be positioned the winch 25 so as to draw the formed tendon from the quiver 9 into each duct 27.

A further typical concrete structure is illustrated in FIG. 10 at 28 having buttresses 29 each with ducts 30. The structure 28 is a large structure having a gallery 31 formed therein. A quiver 9 is laid on the ground and filled with strands in the manner previously described. A guide tube 32 for the tendon is then employed so as to direct the tendon in the desired direction. Through this guide tube 32 the winch cable 20 is passed so as to draw the tendon of strands into and through the appropriate ducts 30. Anchoring and post-tensioning of the tendons would be carried out in conventional manner.

The utilisation of the invention as set out above enables large concrete structures to be provided with post-stressing tendons in an expeditious manner with the knowledge that jamming of the strands within the ducts is not going to occur. The tubes 10 of the quiver 9 in receiving only one or a small number of strands ensure that no jamming will take place in that area, and there is no possibility of jamming taking place as the strands which form the tendon are combined as they are being drawn into the duct in the concrete structure. Any number of strands may be used to form the tendon, i.e. from 2 to 90 or more, and as mentioned previously, the tubes which form the quiver may be dispensed with and ducts within the concrete structure itself utilised for the purpose of parking the strands prior to them being formed into a tendon.

We claim:

1. In the post-stressing of concrete structures, a method of inserting a post-stressing tendon into a duct in the structure which comprises providing at least two elongate parking ducts externally of the duct in the concrete structure, inserting at least one tendon strand into one of the elongate parking ducts to house the strand along at least a substantial portion of its length, inserting at least one further strand into anOther of the parking ducts to house the strand along at least a substantial portion of its length, and drawing all of said strands as a group simultaneously from the respective parking ducts into the duct in the structure.

2. The method as claimed in claim 1, including feeding the strands from a coil thereof successively through a feeder device to said parking ducts, and severing each length of strand from the coil after it is in position in the parking duct.

3. The method as claimed in claim 1, wherein the step of drawing includes gripping one end of each strand in a gripping device which is drawn through the duct in the structure to position the tendon therein.

4. Apparatus for inserting a post stressing tendon into a duct in a concrete structure comprising a sheaf of open ended, elongate parking tubes, each tube having a length sufficient to receive at least a substantial portion of one tendon strand, means for feeding successive lengths of strand from a supply coil to each of said parking tubes, means for severing successive lengths of strand from the supply coil, and means for drawing all of said strands as a group simultaneously from said parking tubes and into a common duct in a concrete structure to form a tendon therein.

5. Apparatus as claimed in claim 4, in which said means for drawing the strands simultaneously into the common duct includes a gripping device in the form of a sock having a mesh structure with a ring at its closed end whereby the sock surrounding an end portion of all the strands and the ring, being used to draw the tendon through the duct in the structure, grip the strands with a force dependent on the force used to draw the tendon through the duct.

6. Apparatus as claimed in claim 4, in which each parking tube is in the form of a cylinder each to receive a single strand.

7. Apparatus as claimed in claim 4, in which each tube is adapted to receive a plurality of strands.

8. Apparatus as claimed in claim 7, in which each tube is extruded to form separate integral ducts each adapted to house a strand.

9. Apparatus as claimed in claim 4 in which an apertured block is provided which forms a guide for the strands, each aperture having a projecting sleeve over each of which a parking duct is positioned to form a lead-in as strands are fed to the ducts.

10. Apparatus as claimed in claim 4 in which the sheaf of tubes is provided with intermediate clamps.

11. Apparatus as claimed in claim 4 in which said tubes are formed of polyethylene.

* * * * *